US009499107B1

(12) United States Patent
Guinn, Jr.

(10) Patent No.: US 9,499,107 B1
(45) Date of Patent: Nov. 22, 2016

(54) RACK FOR STORING ELASTIC STRAPS

(71) Applicant: Charlie Guinn, Jr., Keene, TX (US)

(72) Inventor: Charlie Guinn, Jr., Keene, TX (US)

( * ) Notice: Subject to any disclaimer, the term of this patent is extended or adjusted under 35 U.S.C. 154(b) by 0 days.

(21) Appl. No.: 14/618,741

(22) Filed: Feb. 10, 2015

(51) Int. Cl.
A47F 7/00 (2006.01)
B60R 11/06 (2006.01)
B60P 7/08 (2006.01)

(52) U.S. Cl.
CPC .............. B60R 11/06 (2013.01); A47F 7/005 (2013.01); B60P 7/0823 (2013.01)

(58) Field of Classification Search
CPC ...... B60R 11/06; B60P 7/0823; A47F 7/005; A47F 7/17; A47F 5/16; A47F 1/126; A47F 7/19; A47F 7/12; A47F 1/04; A47F 1/06; A47B 2097/003; B65H 75/06; B25B 11/00; B25B 1/2421; B26D 7/20; A47G 25/74; A47G 25/76
USPC ......... 211/13.1, 26.2, 59.3, 123, 105.1, 120; 294/159, 166, 168, 143; D8/356, D8/360.1, 360; 242/405.2, 404.1, 613, 13; 224/403, 405, 552; 269/254 CS, 291, 269/289, 266 R
See application file for complete search history.

(56) References Cited

U.S. PATENT DOCUMENTS

| | | | | |
|---|---|---|---|---|
| 1,035,825 A | * | 8/1912 | Hesser .................... | B65H 75/06 24/131 R |
| 1,852,195 A | * | 4/1932 | Shaw .................... | A47B 21/045 100/219 |
| 2,038,781 A | * | 4/1936 | Drew ...................... | A47F 13/04 211/13.1 |
| 2,118,957 A | * | 5/1938 | Wagner .................. | C25D 17/08 204/297.09 |
| 2,448,171 A | * | 8/1948 | Campbell ............... | A61F 17/00 206/803 |
| 2,468,115 A | * | 4/1949 | Saul, Jr. .................. | B65G 1/07 280/79.2 |
| 2,501,443 A | * | 3/1950 | Fitzsimmons ......... | A01K 97/06 211/120 |
| 2,802,575 A | * | 8/1957 | Jeune ....................... | B65G 1/07 108/106 |
| 2,901,202 A | * | 8/1959 | Stava ....................... | A61N 5/01 248/572 |
| 2,951,589 A | * | 9/1960 | Dudley .................... | A47F 7/12 211/59.1 |
| 3,163,292 A | * | 12/1964 | Shelley .................. | A47B 51/00 211/59.3 |
| 3,290,453 A | * | 12/1966 | Jensen ............... | B65H 75/4476 174/135 |
| 3,407,015 A | * | 10/1968 | Silberberg ............... | B65G 1/07 312/71 |
| 3,511,548 A | * | 5/1970 | McIlhone ................ | B65G 1/07 108/136 |
| 4,135,655 A | * | 1/1979 | Brown .................... | B65G 7/12 211/41.15 |
| 4,214,684 A | * | 7/1980 | Galowitz ............... | A63B 47/00 206/315.9 |
| 4,505,506 A | * | 3/1985 | Picozza .................... | A45F 3/46 206/503 |
| D282,337 S | * | 1/1986 | Picozza ......................... | D7/622 |

(Continued)

FOREIGN PATENT DOCUMENTS

EP 1113742 B1 7/2001

Primary Examiner — Jennifer E Novosad
(74) Attorney, Agent, or Firm — James E. Walton

(57) ABSTRACT

A system and method for securing elastic rubber bungee cords under tension, thereby preventing tangles, having compression, expansion, and gas springs or pistons to apply a tension force to the straps that are wrapped around the rack. The rack allows for a few dozen straps to be secured and released from the rack concurrently.

17 Claims, 10 Drawing Sheets

(56) References Cited

U.S. PATENT DOCUMENTS

| | | | | |
|---|---|---|---|---|
| 4,577,809 A * | 3/1986 | Auer | ................ | B65H 59/22 191/12.2 R |
| 4,828,119 A * | 5/1989 | Pingelton | ................ | B65G 1/07 211/59.3 |
| 5,064,067 A * | 11/1991 | McAllister | ................ | A47F 7/005 206/420 |
| 5,139,208 A | 8/1992 | Schooley | | |
| 5,145,122 A * | 9/1992 | Poister | ................ | B65H 75/06 24/129 R |
| 5,279,428 A * | 1/1994 | Lee | ................ | A47F 7/0028 211/26 |
| 5,322,171 A * | 6/1994 | Pingelton | ................ | B65G 1/07 108/136 |
| 5,803,519 A * | 9/1998 | Daigle | ................ | A01K 97/08 211/70.8 |
| 5,845,787 A | 12/1998 | Dunnavant | | |
| 5,938,260 A * | 8/1999 | Wallace | ................ | B65H 49/30 242/596 |
| 6,099,060 A * | 8/2000 | Towers | ................ | A47F 7/00 211/13.1 |
| 6,302,347 B1 * | 10/2001 | Amirault | ................ | B65H 75/06 242/388.1 |
| 6,382,436 B1 * | 5/2002 | Wang | ................ | A47B 57/26 211/187 |
| 7,383,959 B1 * | 6/2008 | Rudd | ................ | A47F 7/00 211/13.1 |
| 7,387,211 B2 * | 6/2008 | Anspach | ................ | A47F 7/005 211/13.1 |
| D602,765 S * | 10/2009 | Craiglow | ................ | D8/356 |
| 8,074,795 B2 * | 12/2011 | Neu | ................ | B65D 25/10 206/279 |

\* cited by examiner

RACK FOR STORING ELASTIC STRAPS

BACKGROUND

1. Field of the Invention

The present invention relates in general to the field of stretchable elastic straps and how to store them neatly and conveniently in use with the trucking industry.

2. Description of Related Art

Rubber elastic straps with hooks on either ends are well known and used in the trucking industry for securing cargo and tarps. Typically the straps are manufactured in various set lengths, for example 10 inches, 15 inches, 21 inches, 31 inches, and 41 inches. Truckers typically store a pile of straps in their truck for securing cargo and tarps. Because of the exposed hooks on the ends of the bungee cord straps the pile typically must be detangled before they can be used. Detangling a pile of straps results in lost time for truckers.

Referring to FIG. 1 in the drawings, a prior art embodiment of a typical rack for storing rubber bungee elastic straps according to the present application is illustrated. Rack 101 includes a first bar 105 and a second bar 109. As illustrated bungee cord 111 is hooked to first bar 105, wrapped over second bar 109 and then secured again to first bar 105. Rack 101 has a few inherent limitations. First, each strap has to be stretched individually to be attached to rack 101 and detached from rack 101. Because truckers typically use approximately one hundred elastic straps with a single load of cargo the time to stretch and un-stretch so many bungee codes becomes prohibitive. Second, much like the pile of straps described above, rack 101 doesn't organize the elastic straps. While there are many ways to store elastic straps known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
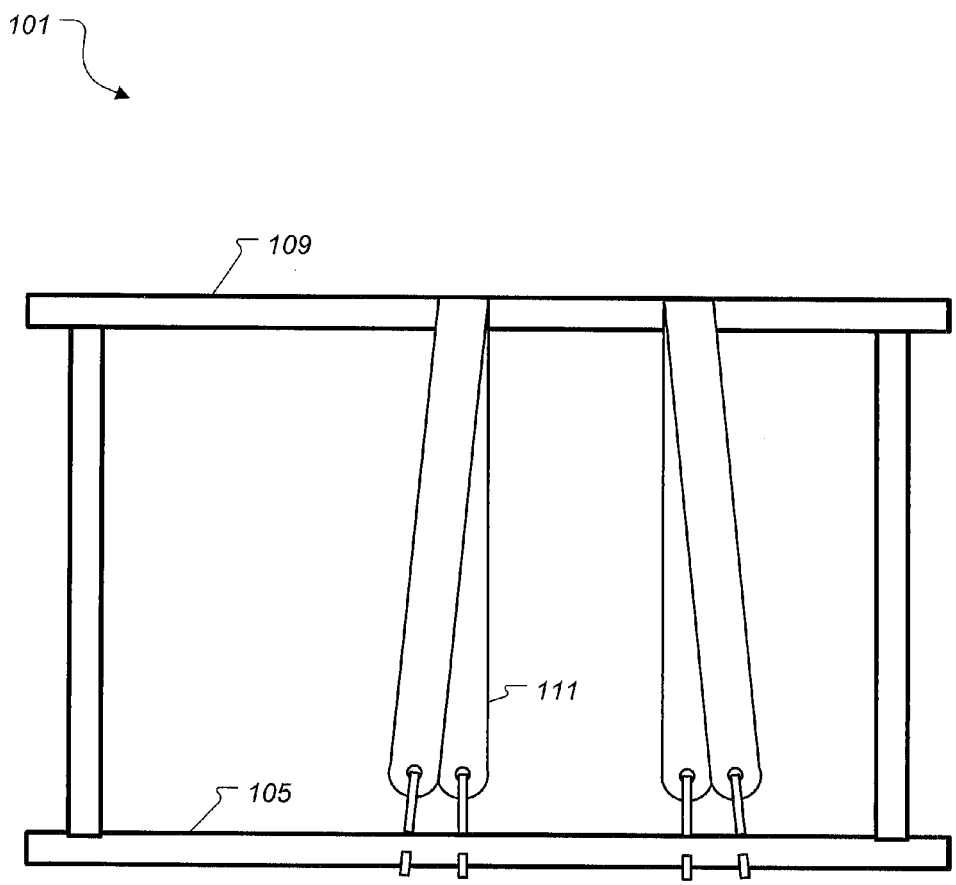
FIG. 1 is a plan view of a typical rack for storing rubber bungee elastic straps according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of storing elastic straps are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
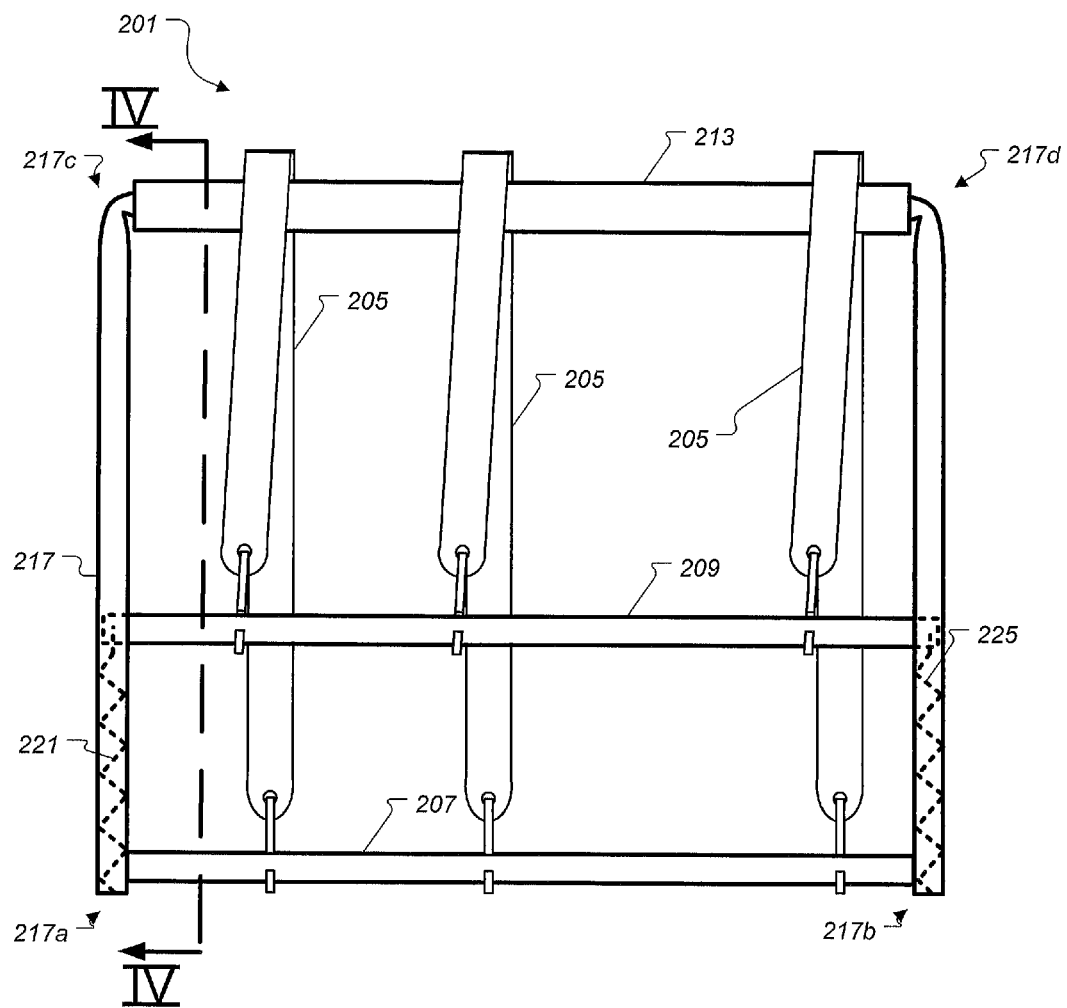
FIG. 2 is a plan view of an embodiment of a rack for storing elastic straps according to the present application.

Referring now also to FIG. 2 in the drawings, an embodiment of a rack for storing elastic straps according to the present application is illustrated. Rack 201 is configured for storing plurality of rubber elastic straps 205. Rack 201 has a first bar 207, a tension bar 209, a rolling bar 213, a u-shaped member 217 with first end 217a and a second end 217b, a first mechanism 221, and a second mechanism 225. While springs; such as compression, expansion, tension springs, and gas springs, are preferred for the first mechanism 221 and the second mechanism, other devices capable of pushing or pulling are contemplated by this application such as gas filled pistons.

First bar 207 is preferably angled approximately 45 degrees relative to a plane formed by the u-shaped member 217. Angling first bar 207 relative to the rest of the rack 201 facilitates a user coupling the rack 201, the straps 205 and the side of a truck trailer. The hooks on either end of the straps 205 are more accessible to couple to truck trailer railing. First bar 207 is typically welded to the ends of u-shaped member to form a rectangle shaped rack, however other methods of fastening the parts together are contemplated such as rivets, screws, and adhesives.

Tension bar 209 is preferably a hollow tube with flattened ends. First mechanism 221 applies a first force between tension bar 209 and u-shaped member 217, and the first mechanism is in tension. Second mechanism 225 applies a second force between tension bar 209 and u-shaped member 217 and second mechanism is in tension. The springs pull the tension bar 209 towards the first bar 207. U-shaped member 217, is typically formed from a metal tube with a first 217c and a second 217d 90 degree bend, and includes slots for receiving the flattened ends of tension bar 209. The slots allow the tension bar to slide between a locked position and an un-locked position. FIG. 2 illustrates the locked position of rack 201 as the tension bar is pushed as far away from the first bar 207 as the springs will allow. Rolling bar is a tube surrounding the u-shaped member located opposite the open end of the u-shaped member 217 between the first bend 217a and the second bend 217d.

Starting with a plurality of elastic straps hanging from an edge of a flatbed trailer with the dangling hooks of the elastic straps facing away from the user and towards a center of the trailer. To load rack 201 with the elastic straps 205 the user first locks the tension bar in place. Next the user hooks the tension bar 209 with the dangling hooks pulling downwards while rotating the rack so the elastic straps bend around the rolling bar 213 and then hooks the remaining end of the elastic straps 205 to the flat bar 207. Once the user unlocks the tension bar 209, the elastic straps are stretched and secured to the rack 201.

To remove the straps 205 from the rack 201 the process is reversed. The ends of the elastic straps 205 hooked on the flat bar are hooked to the side of the trailer. Tension bar 209 is pulled away from the first bar 207 and locked into slots of rack 201. The rack 201 is pulled downward, thereby stretching the elastic straps 205. As the rack 201 is rotated around, the tension in the straps is released by moving the tension bar 209 away from first bar 207. At this point the elastic straps 205 are now hanging from the side of the trailer.

Figure 3:
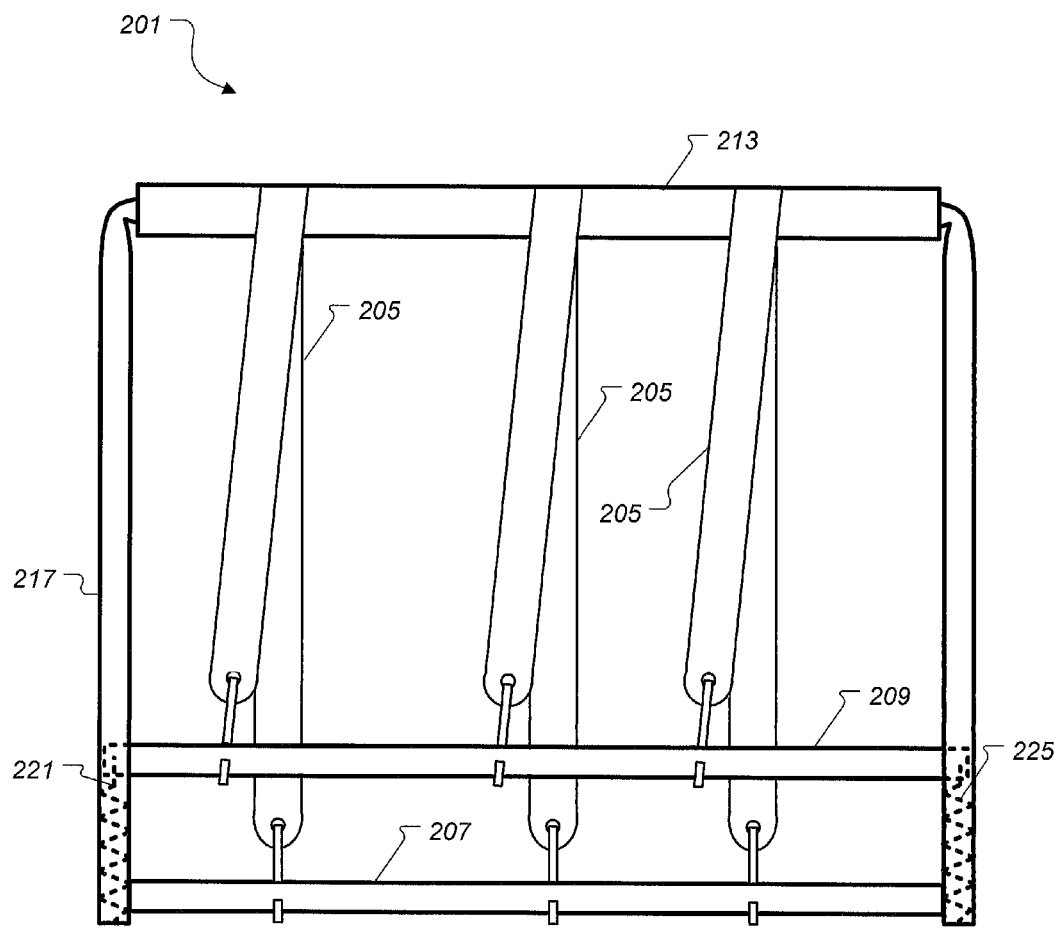
FIG. 3 is a plan view of an embodiment of a rack for storing elastic straps according to the present application.

Referring now also to FIG. 3 in the drawings, an embodiment of a rack for storing elastic straps according to the present application is illustrated. FIG. 3 illustrates the unlocked position of rack 201 as the tension bar 209 is pulled as close as possible to the first bar 207 as the springs will allow. It should be apparent that any slack in the elastic straps 205, as shown in FIG. 2, has been removed by the tension bar moving, as shown in FIG. 3.

Figure 4:
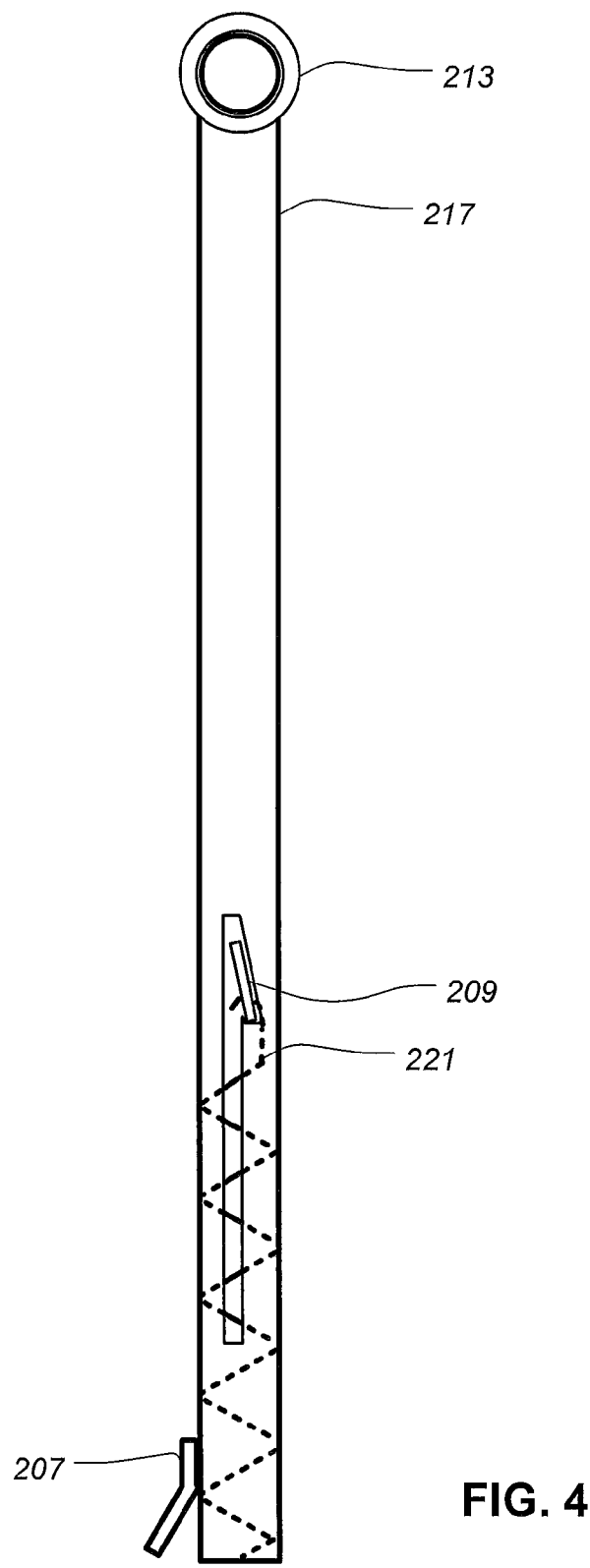
FIG. 4 is a section view from FIG. 2 of an embodiment of a rack for storing elastic straps according to the present application.

Referring now also to FIG. 4 in the drawings, a section view of part of FIG. 2, an embodiment of a rack for storing elastic straps according to the present application is illustrated. The slot of the u-shaped member 217 is illustrated having a locked position and an un-locked position. FIG. 4 illustrates the tension bar 209 in the locked position.

Figure 5:
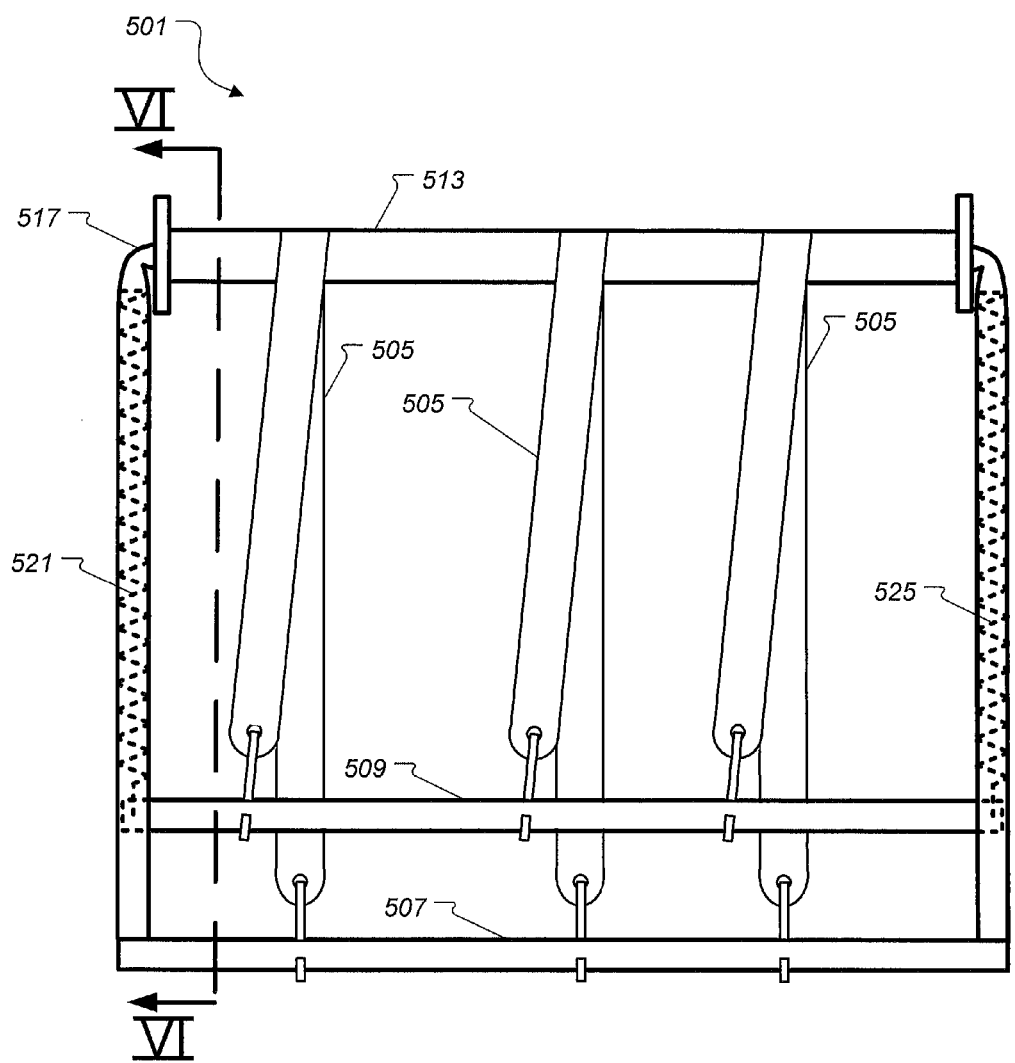
FIG. 5 is a plan view of an embodiment of a rack for storing elastic straps according to the present application.

Referring now also to FIG. 5 in the drawings, an alternate embodiment of a rack for storing elastic straps according to the present application is illustrated featuring compression springs. Rack 501 is configured for storing plurality of rubber elastic straps 505. Rack 501 has a first bar 507, a tension bar 509, a rolling bar 513, a member 517, a first spring 521, and a second spring 525.

First bar 507 is preferably angled approximately 45 degrees relative to a plane formed by the u-shaped member 517. Angling first bar 507 relative to the rest of the rack 501 facilitates a user coupling the rack 501, the straps 505 and the side of a truck trailer. The hooks on either end of the straps 505 are more accessible to couple to the truck trailer railing. First bar 507 is typically welded or alternatively riveted to the ends of u-shaped member to form a rectangle shaped rack.

Tension bar 509 is preferably a hollow tube with flattened ends. First spring 521 is in compression between tension bar 509 and member 517. Second spring 525 is in compression between tension bar 509 and member 517. The springs pushed the tension bar 509 towards the first bar 507. Member 517, is typically formed from a metal tube with two 90 degree bends, includes slots for receiving the flattened ends of tension bar 509. The slots allow the tension bar to slide between a locked position and an un-locked position. FIG. 5 illustrates the un-locked position of rack 501 as the tension bar is pushed as close to the first bar 507 as the springs will allow. Rolling bar is a free spinning tube surrounding the u-shaped member located opposite the open end of the member 517. In an alternative embodiment, washers or flanges with an exterior diameter approximately twice the size of the rolling bar are place just outside the rolling bar and around the member 517 to keep the elastic straps from rolling off the rack 501.

Figure 6:
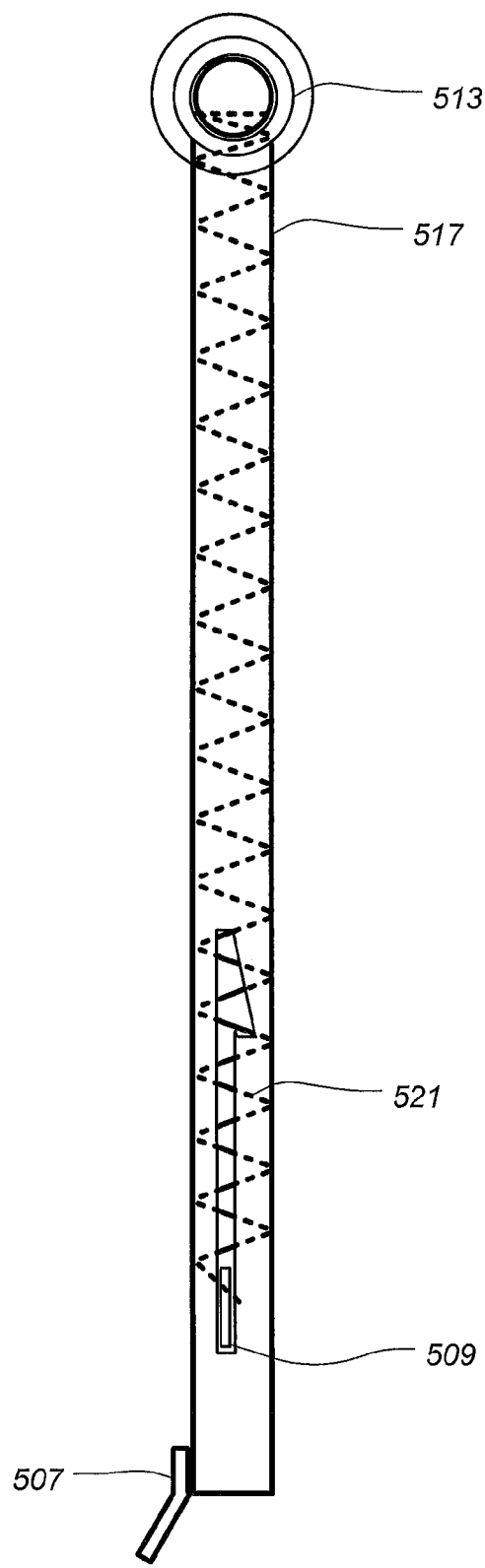
FIG. 6 is a section view from FIG. 5 of an embodiment of a rack for storing elastic straps according to the present application.

Referring now also to FIG. 6 in the drawings, a section view of part of FIG. 5, an embodiment of a rack for storing elastic straps according to the present application is illustrated. The slot of the u-shaped member 517 is illustrated having a locked position and an un-locked position. FIG. 6 illustrates the tension bar 509 in the un-locked position.

Figure 7:
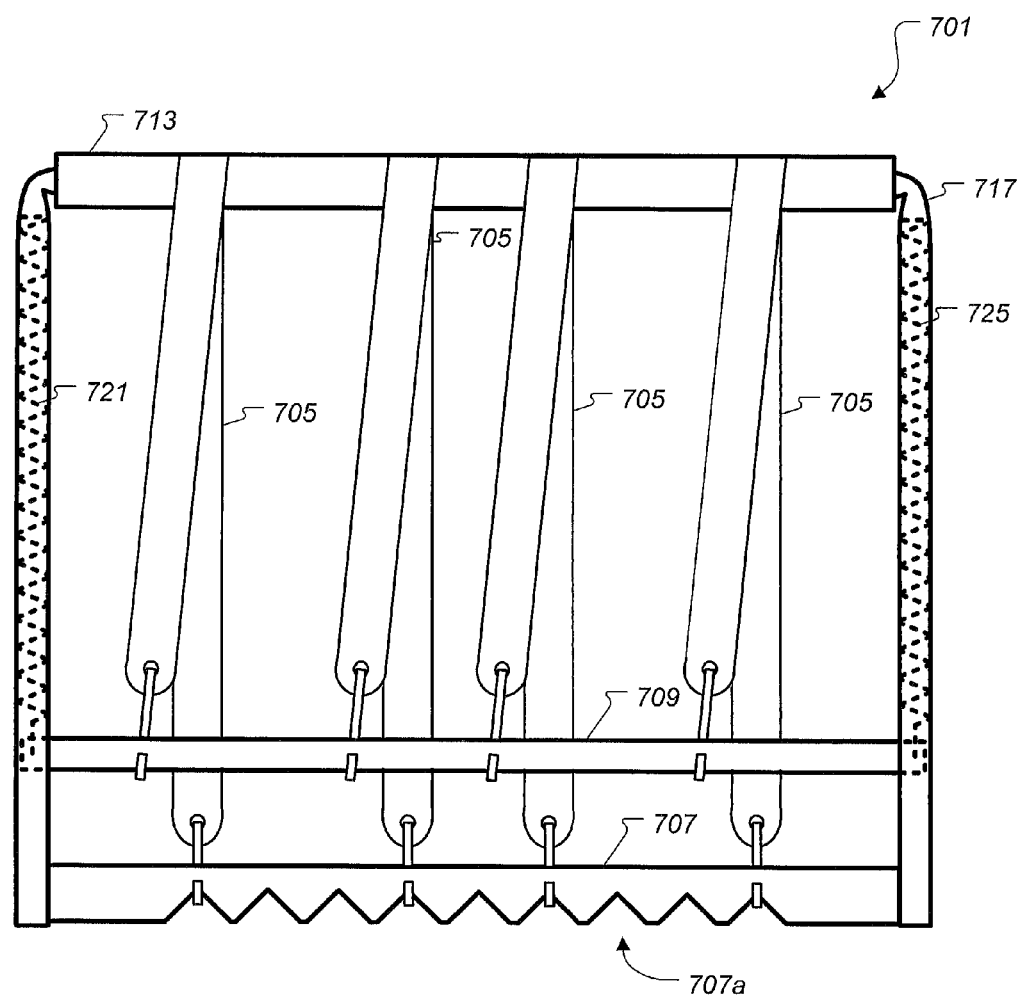
FIG. 7 is a plan view of an embodiment of a rack for storing elastic straps according to the present application.

Referring now also to FIG. 7 in the drawings, an alternate embodiment of a rack for storing elastic straps according to the present application is illustrated featuring a grooved bar. Rack 701 is configured for storing plurality of rubber elastic straps 705. Rack 701 has a first bar 707, a tension bar 709, a rolling bar 713, a u-shaped member 717, a first spring 721, and a second spring 725.

First bar 707 is preferably angled approximately 45 degrees relative to a plane formed by the u-shaped member 717. Angling first bar 707 relative to the rest of the rack 701 facilitates a user coupling the rack 701, the straps 705 and the side of a truck trailer. The hooks on either end of the straps 705 are more accessible to couple to the truck trailer railing. First bar 707 is typically welded or alternatively riveted to the ends of u-shaped member to form a rectangle shaped rack. A unique feature of first bar 707 are the notches 707a cut into the bar. The notches 707a are configured to space the elastic straps 705 evenly along the rack 701. As the straps 705 are wrapped around the rack, the hooks of the straps are guided towards the center of the notches. Furthermore, the number of notches in the first bar 707 designates to the user the number of straps to attach to the rack. No notches are placed a few inches near the u-shaped member along the first bar to provide space for the users hand to disengage the locked tension bar.

Tension bar 709 is preferably a hollow tube with flattened ends. First spring 721 is in compression between tension bar 709 and u-shaped member 717. Second spring 725 is in compression between tension bar 709 and u-shaped member 717. The springs pushed the tension bar 709 towards the first bar 707. U-shaped member 717, is typically formed from a metal tube with two 90 degree bends, includes slots for receiving the flattened ends of tension bar 709. The slots allow the tension bar to slide between a locked position and an un-locked position. FIG. 7 illustrates the un-locked position of rack 701 as the tension bar is pushed as close to the first bar 707 as the springs will allow. Rolling bar is a free spinning tube surrounding the u-shaped member located opposite the open end of the u-shaped member 717.

Figure 8:
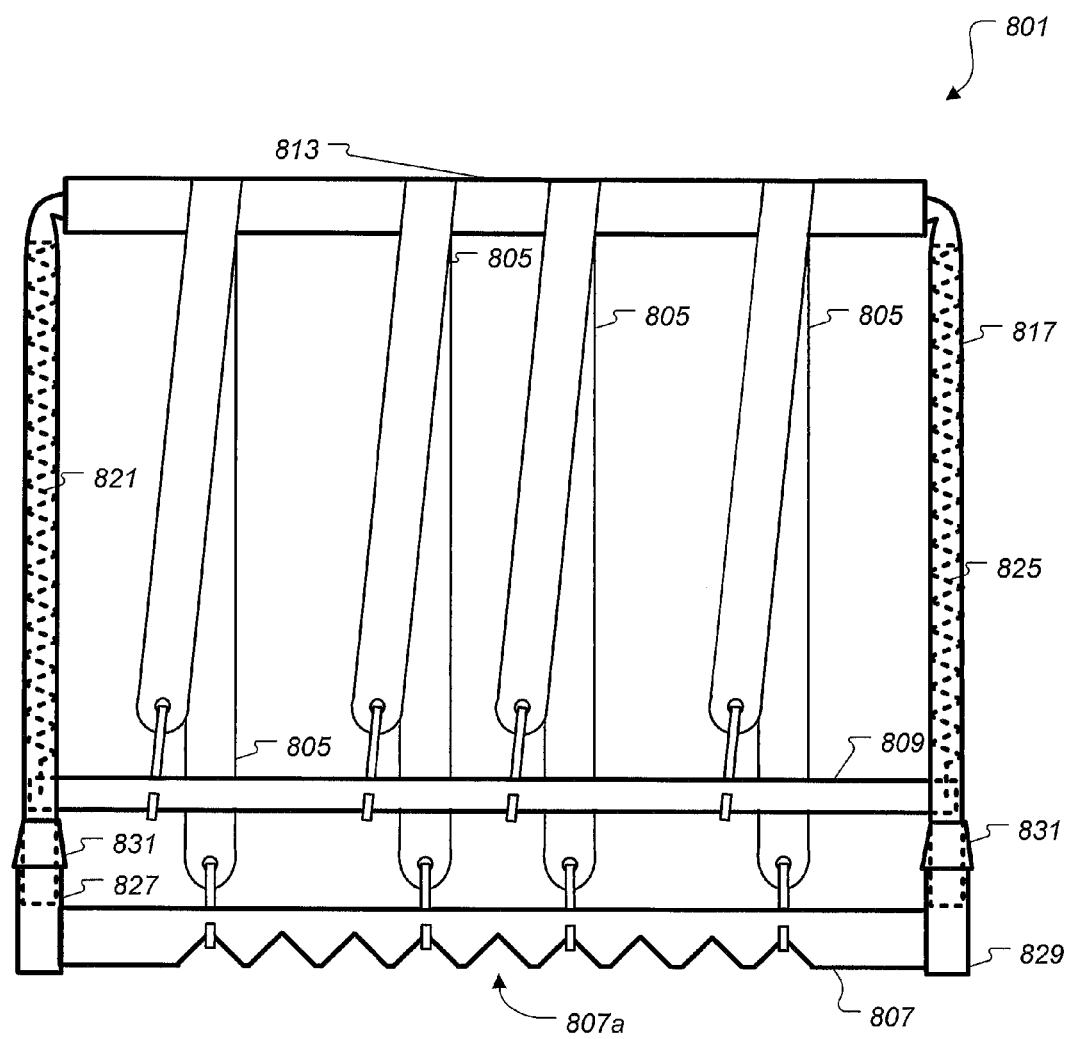
FIG. 8 is a plan view of an embodiment of a rack for storing elastic straps according to the present application.

Referring now also to FIG. 8 in the drawings, an alternate embodiment of a rack for storing elastic straps according to the present application is illustrated featuring a grooved bar. Rack 801 is configured for storing plurality of rubber elastic straps 805. Rack 801 has a first bar 807, a tension bar 809, a rolling bar 813, a u-shaped member 817, a first spring 821, and a second spring 825.

First bar 807 is preferably angled approximately 45 degrees relative to a plane formed by the u-shaped member 817. Angling first bar 807 relative to the rest of the rack 801 facilitates a user coupling the rack 801, the straps 805 and the side of a truck trailer. The hooks on either end of the straps 805 are more accessible to couple to the truck trailer railing. First bar 807 is typically spot welded or riveted to the ends of first extension 827 and second extension 829. A unique feature of first bar 807 are the notches 807a cut into the bar. The notches 807a are configured to space the elastic straps 805 evenly along the rack 801. As the straps 805 are wrapped around the rack, the hooks of the straps are guided towards the center of the notches. Furthermore, the number of notches in the first bar 807 designates to the user the number of straps to attach to the rack. No notches are placed a few inches near the u-shaped member along the first bar to provide space for the users hand to disengage the locked tension bar.

Tension bar 809 is preferably a hollow tube with flattened ends. First spring 821 is in compression between tension bar 809 and u-shaped member 817. Second spring 825 is in compression between tension bar 809 and u-shaped member 817. The springs pushed the tension bar 809 towards the first bar 807. U-shaped member 817, is typically formed from a metal tube with two 90 degree bends, includes slots for receiving the flattened ends of tension bar 809. The slots allow the tension bar to slide between a locked position and an un-locked position. Slots can be sealed with flexible covers to prevent the migration of dirt into the springs. FIG. 8 illustrates the un-locked position of rack 801 as the tension bar 809 is pushed as close to the first bar 807 as the springs will allow. Rolling bar is a free spinning tube surrounding the u-shaped member located opposite the open end of the u-Specification shaped member 817. U-shaped member 817 is slidingly coupled to the first extension 827 and the second extension 829. Fittings or locks 831 compress the interface between the extensions and the u-shaped member. A user can adjust the height of the rack by unlocking the lock 831 and sliding u-shaped member 817 relative to the first bar 807. Adjusting the height allows the rack to be used with other lengths of elastic straps. It should be apparent that elements that allow for adjustable length of rack 801 can be combined with rack 201 so long as the elements were located in the portions of the u-shaped member without the spring inside.

Figure 9:
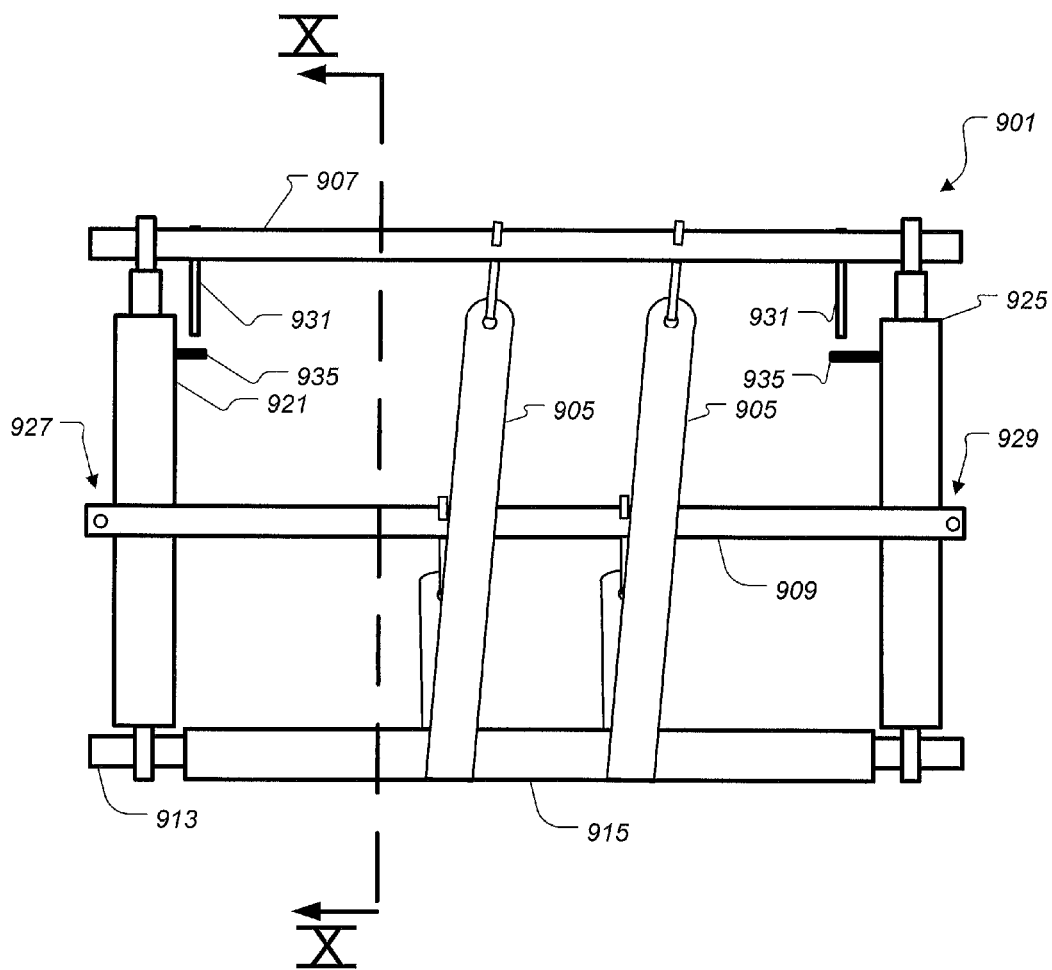
FIG. 9 is a plan view of an embodiment of a rack for storing elastic straps according to the present application.
Figure 10:
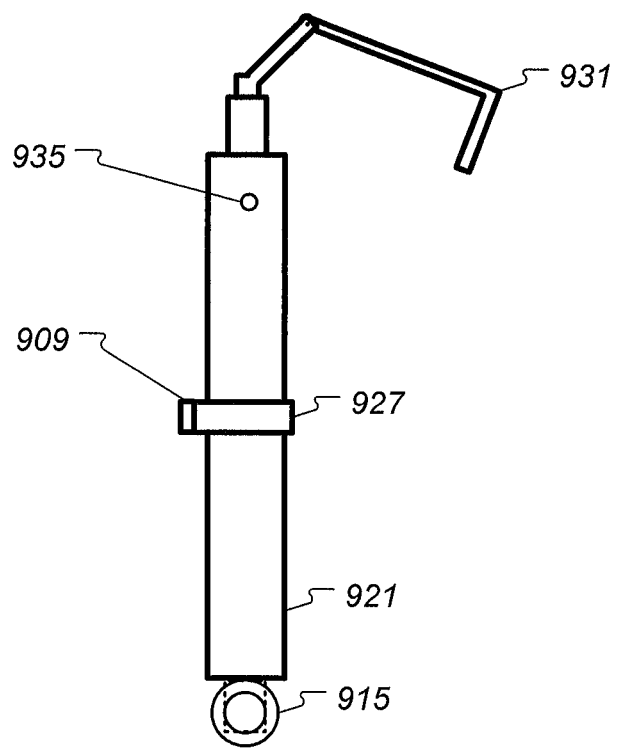
FIG. 10 is a section view from FIG. 9 of an embodiment of a rack for storing elastic straps according to the present application.

Referring now also to FIGS. 9 and 10 in the drawings, an alternate embodiment of a rack for storing elastic straps according to the present application is illustrated featuring pistons. Rack 901 has a first rod 907, a tension rod 909, a roller bar 913, a roller 915 located around the roller bar 913, a first piston 921, and a second piston 925. First piston 921 and second piston 925 are gas springs having an elongated position and an un-elongated position. Tension rod 909 is clamped to the first piston 921 by clamp 927 and to the second piston 925 by clamp 929. FIG. 9 illustrates the elongated position as any slack in the elastic straps 905 is removed. The position of the tension rod 909 can be moved relative to the first rod 907 by sliding the clamps 927 and 929 along the length of the pistons 921 and 925 respectively, thereby allowing rack to accommodate heavy duty elastic rubber straps of various lengths.

Rack 901 before use would be compressed and latches 931 rotated to hold the first rod 907 in place. Elastic straps 905 are clipped to either rod and folded over the unclipped rod. The user would then un-compress the pistons, by rotating latches away from the pins 935 which releases the gas springs, thereby lengthening the rack 901 and securing the elastic straps 905. The process is reversed to remove the straps.

One method of using the rack starts with providing a rack for storing elastic straps under tension and providing a plurality of elastic straps having a first end and a second end. Arranging the plurality of elastic straps to face the same direction. Locking the rack in an un-tensioned position. Hooking a first end of the plurality of elastic strap to the rack. Rotating the rack over until the plurality of elastic straps are folded over the rack. Hooking the second end of the plurality of elastic straps to the rack; and applying tension to the elastic straps by unlocking the rack. The spacing of the straps can be assisted by having the rack be notched to align the straps. Furthermore, it is useful to angle the rack relative to the plurality of straps before hooking the first end of the straps to the rack.

The described racks reduce the amount of time organizing and securing large quantities of rubber elastic straps. The racks also prevents the elastic straps from tangling each other when not in use. Furthermore, preferably 25 straps can be stored concurrently, it should be apparent that the number of heavy duty elastic straps concurrently stored on a rack ranges from 15 to 50. While less straps can be used the time savings is diminished with less straps and while more straps can be added the force required to concurrently stretch more than 50 straps becomes difficult.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rack for storing elastic straps, comprising:
   a member having;
      a first slot;
      a second slot;
   a first bar rigidly attached to the member;
   a tension bar received by the first slot and the second slot;
   a rolling tube around the member;
   a first mechanism for applying a first force between the tension bar and the member; and
   a second mechanism for applying a second force between the tension bar and the member;
   wherein the rolling tube is configured to allow the elastic straps to rotate around the member by the rolling tube spinning freely around the member; and
   wherein the tension bar slides between a locked position and an unlocked position.

2. The rack for storing elastic straps according to claim 1, wherein the first mechanism and the second mechanism are compression springs.

3. The rack for storing elastic straps according to claim 1, wherein the first mechanism and the second mechanism are expansion springs.

4. The rack for storing elastic straps according to claim 1, further comprising:
   a plurality of notches cut in the first bar.

5. The rack for storing elastic straps according to claim 1, the member further comprising:
   locks;
   wherein the locks allow for a distance between the rolling tube and the first bar to be adjusted thereby allowing the rack to store elastic straps of various lengths.

6. The rack for storing elastic straps according to claim 1, wherein the first bar is angled relative to the member.

7. The rack for storing elastic straps according to claim 1, further comprising:
   washers located adjacent the rolling tube.

8. The rack for storing elastic straps according to claim 1, further comprising:
   covers for the first slot and the second slot.

9. The rack for storing elastic straps according to claim 1, wherein the first mechanism, and the second mechanism are gas springs.

10. A rack for storing elastic straps under tension, comprising:
   a u-shaped member having;
      a first bend;
      a second bend;
      a first end;
      a second end;
      a first slot; and
      a second slot;
   a bar welded to each of the first and second ends of the u-shaped member;
   a tension bar slidingly coupled to the u-shaped member by the first slot and the second slot;
   a rolling tube covering the u-shaped member between the first bend and the second bend;
   a first spring located inside the u-shaped member between the first bend and the first end; and
   a second spring located inside the u-shaped member between the second bend and the second end;
      wherein the rolling tube spins freely around the u-shaped member; and
      wherein the tension bar slides between a locked position and an unlocked position.

11. The rack for storing elastic straps under tension according to claim 10, wherein the first spring and the second spring are under compression.

12. The rack for storing elastic straps under tension according to claim 10, wherein the first spring and the second spring are under tension.

13. The rack for storing elastic straps under tension according to claim 10, further comprising:
   a plurality of notches cut in the bar.

14. The rack for storing elastic straps under tension according to claim 10, the u-shaped member further comprising:
   fittings;
   wherein the fittings allow for a distance between the tube and the bar to be adjusted.

15. The rack for storing elastic straps under tension according to claim 10, wherein the bar is angled relative to the u-shaped member.

16. The rack for storing elastic straps under tension according to claim 10, further comprising:
   flanges located between the tube and the first bend and the second bend;
   wherein the flanges are configured for retaining the elastic straps between the flanges.

17. The rack for storing elastic straps under tension according to claim 10, further comprising:
   covers for first and second slots.

* * * * *